United States Patent
Seubert et al.

(10) Patent No.: US 9,063,312 B2
(45) Date of Patent: Jun. 23, 2015

(54) OPTICAL-FIBER-BASED LIGHT SOURCE

(75) Inventors: Ronald Seubert, Sammamish, WA (US); Jeremy Cooper, Issaquah, WA (US)

(73) Assignee: GE HEALTHCARE BIO-SCIENCES CORP., Piscataway, NJ (US)

( * ) Notice: Subject to any disclaimer, the term of this patent is extended or adjusted under 35 U.S.C. 154(b) by 636 days.

(21) Appl. No.: 12/723,604

(22) Filed: Mar. 12, 2010

(65) Prior Publication Data

US 2010/0238681 A1  Sep. 23, 2010

Related U.S. Application Data

(60) Provisional application No. 61/209,996, filed on Mar. 12, 2009, provisional application No. 61/255,362, filed on Oct. 27, 2009.

(51) Int. Cl.
*F21S 4/00* (2006.01)
*G02B 6/42* (2006.01)
*G02B 21/06* (2006.01)

(52) U.S. Cl.
CPC ............. *G02B 6/4298* (2013.01); *G02B 21/06* (2013.01)

(58) Field of Classification Search
CPC .......... G02B 6/0026; F21V 9/16; F21V 13/02
USPC ................................................ 362/551–582
See application file for complete search history.

(56) References Cited

U.S. PATENT DOCUMENTS

| 4,762,381 A | 8/1988 | Uemiya et al. |
| 5,791,758 A * | 8/1998 | Horgan et al. ............... 362/554 |
| 5,995,701 A | 11/1999 | Sugata et al. |
| 2004/0042737 A1 | 3/2004 | Devine et al. |
| 2005/0084229 A1 | 4/2005 | Babbitt et al. |
| 2005/0117846 A1 * | 6/2005 | Amleshi et al. ............ 385/49 |
| 2005/0228260 A1 | 10/2005 | Burwell et al. |

(Continued)

FOREIGN PATENT DOCUMENTS

| JP | S5739594 | 3/1982 |
| JP | S61124904 | 6/1986 |

(Continued)

OTHER PUBLICATIONS

Notice of Reason for Rejection Issued Dec. 24, 2013 on Corresponding JP Application No. 2011-554263.

*Primary Examiner* — William Carter
(74) *Attorney, Agent, or Firm* — Sutherland Asbill & Brennan LLP

(57) ABSTRACT

Various embodiments of the present invention are directed to optical-fiber-based light sources for use in microscopy, spectrometry, and other scientific and technical instruments, devices, and processes. Light-emitting diodes ("LEDs") and other light sources are, in various embodiments of the present invention, incorporated on or within an optical fiber or fiber-optic cable in order to produce a bright optical-fiber-based light source. By incorporating light-emitting devices on or within an optical fiber, a significantly greater photon flux can be obtained, within the optical fiber or fiber-optic cable, than can be obtained by directing light from equivalent, external light-emitting elements into the optical fiber or fiber-optic cable, and the optical-fiber-based light sources of the present invention provide desirable characteristics of the light sources embedded on or within them.

7 Claims, 9 Drawing Sheets

(56) References Cited

U.S. PATENT DOCUMENTS

| | | |
|---|---|---|
| 2006/0187534 A1* | 8/2006 | Hodder et al. ............... 359/333 |
| 2006/0279964 A1 | 12/2006 | Kitamura |
| 2006/0280423 A1* | 12/2006 | Gotfried ....................... 362/555 |
| 2006/0282137 A1* | 12/2006 | Nightingale et al. ........... 607/90 |
| 2007/0217202 A1 | 9/2007 | Sato |
| 2009/0135421 A1* | 5/2009 | Oldham et al. ............... 356/344 |

FOREIGN PATENT DOCUMENTS

| | | |
|---|---|---|
| JP | S63127215 | 5/1988 |
| JP | H11298014 | 10/1999 |

* cited by examiner

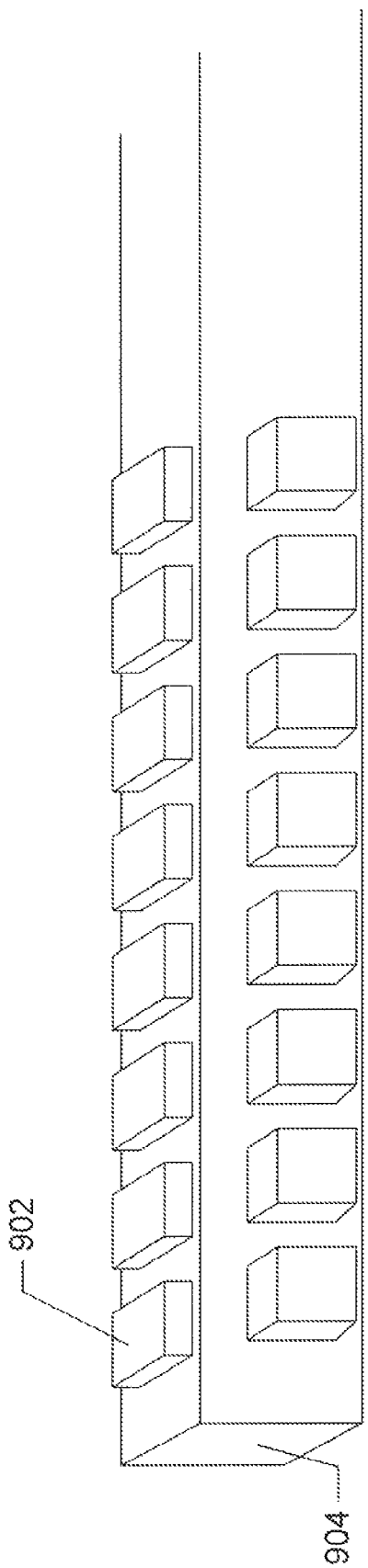
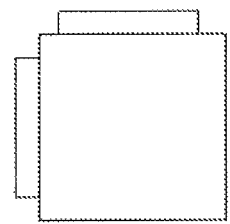
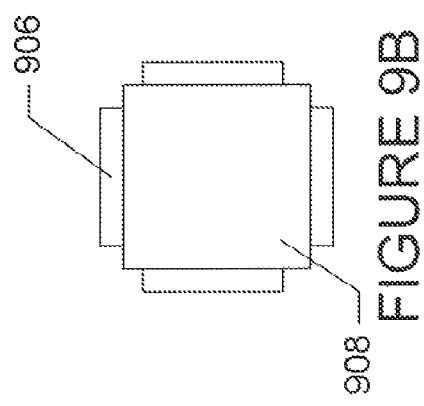
FIGURE 9A
FIGURE 9B
FIGURE 9C
FIGURE 9D

US 9,063,312 B2

OPTICAL-FIBER-BASED LIGHT SOURCE

CROSS REFERENCE TO RELATED APPLICATIONS

This application claims the benefit of Provisional Application No. 61/209,996, filed Mar. 12, 2009 and Provisional Application No. 61/255,362, filed Oct. 27, 2009.

TECHNICAL FIELD

The present invention is related to light sources used in scientific and technical instrumentation, other devices, and for various processes, and, in particular, to a bright optical-fiber-based light source for use in microscopes, spectrometers, and in other scientific and technical instruments, devices, and a variety of processes.

BACKGROUND OF THE INVENTION

Light sources are widely used in a variety of different scientific and technical instruments and devices, including optical microscopes, spectrometers, microarray scanners, cameras and other types of image-recording devices, and are additionally used for illumination, data and image transmission, and in a variety of other applications. Initially, light sources were predominantly based on heated filaments or arc-generated plasmas, including many different types of incandescent lights, mercury arc lamps, xenon lamps, metal-halide lamps, and hybrid arc lamps that use combinations of light-emitting substances, including mercury-xenon arc lamps. During the past 50 years, developments and breakthroughs in physics and materials science have produced many additional types of light sources, including lasers, light-emitting diodes ("LEDs"), and microscale and nanoscale light emitters, including quantum dots. There are significant constraints and parameters to be considered when selecting light sources and adapting light sources to particular applications, including selecting light sources for particular scientific instruments and analytical processes. In many cases, light with wavelengths within a certain portion of the electromagnetic-radiation spectrum, such as the wavelength range corresponding to visible light, is desired, and light with wavelengths in other portions of the electromagnetic-radiation spectrum, including ultra-violet light and shorter-wavelength radiation, are undesirable. Furthermore, particular applications may require a particular minimum photon flux, and may require that the light be delivered, from the light source, through particular transmission media and through apertures of particular dimensions. Researchers and developers of scientific and technical instrumentation and devices, and manufacturers and inventors of such instruments and devices, continue to seek suitable light sources for particular applications.

SUMMARY OF THE INVENTION

Various embodiments of the present invention are directed to optical-fiber-based light sources for use in microscopy, spectrometry, and other scientific and technical instruments, devices, and processes. Light-emitting diodes ("LEDs") and other light sources are, in various embodiments of the present invention, incorporated on or within an optical fiber or fiber-optic cable in order to produce a bright optical-fiber-based light source. By incorporating light-emitting devices on or within an optical fiber, a significantly greater photon flux can be obtained, within the optical fiber or fiber-optic cable, than can be obtained by directing light from equivalent, external light-emitting elements into the optical fiber or fiber-optic cable, and the optical-fiber-based light sources of the present invention provide desirable characteristics of the light sources embedded on or within them.

BRIEF DESCRIPTION OF THE DRAWINGS

FIGS. 9A-D illustrate additional embodiments of the present invention.

DETAILED DESCRIPTION OF THE INVENTION

Figure 1:
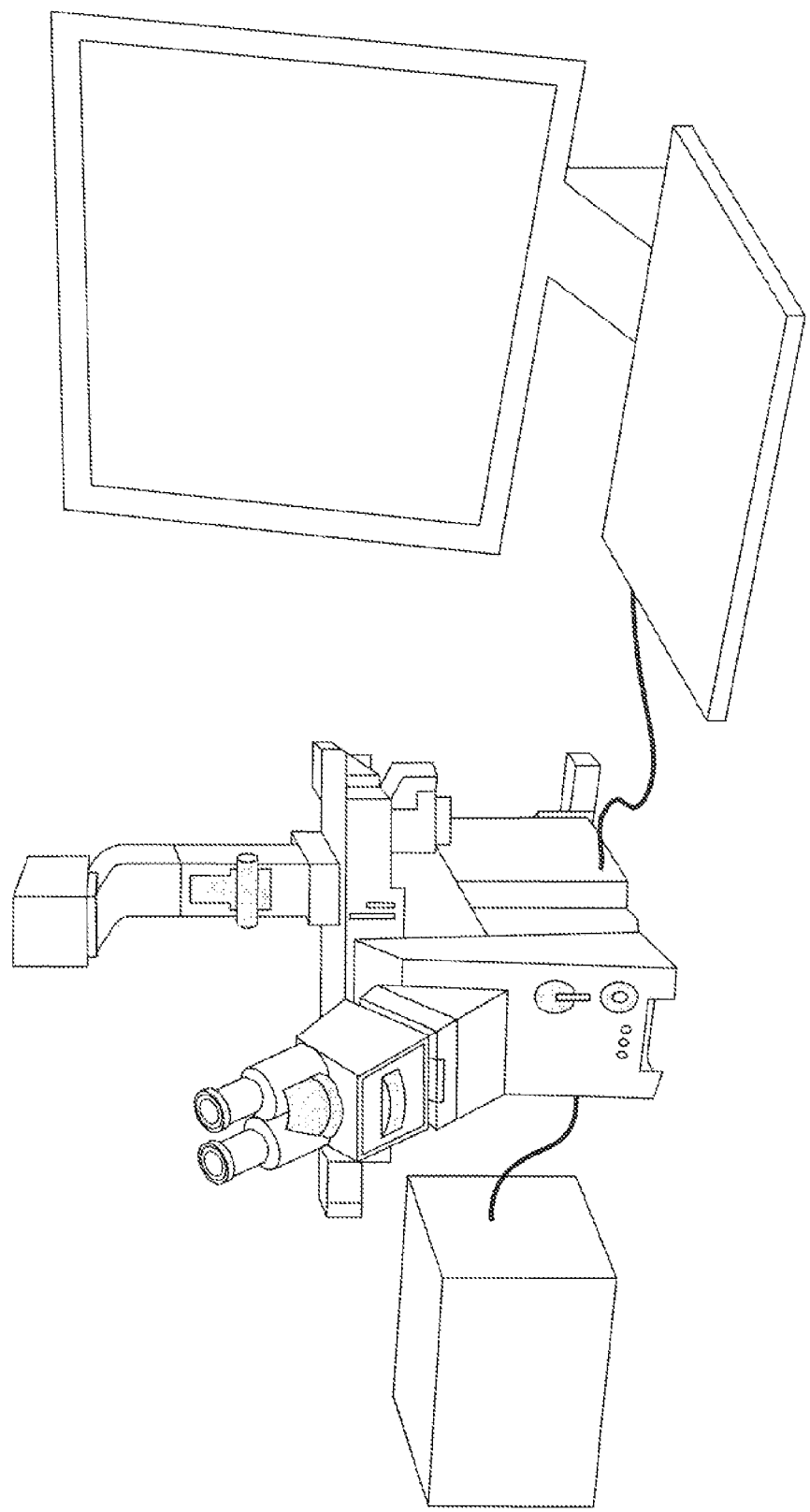
FIG. 1 shows an optical microscope connected to a light source.

A wide variety of different types of light sources are used in scientific instruments, technical instruments, various other devices, in various analytical and practical processes, and for a wide variety of different applications. One exemplary use for light sources is optical microscopy, including fluorescence microscopy. FIG. 1 shows an optical microscope connected to a light source. The optical microscope 102 is connected with a light source 104 via an optical-fiber cable 106. In this particular application, the external light source may also be a significant source of heat. Removing the light source from direct contact with, or incorporation within, the microscope 102 eliminates the need for high-capacity heat-removal hardware that might otherwise be necessary to control temperature within and near the sample being examined by the microscope. In addition, the optical fiber provides a small-aperture, pinpoint light source for microscopy and for other applications. Optical-fiber-based light sources have many additional applications, including spectrometry, illumination or difficult-to-access volumes, sensors, and many other applications.

Figure 2:
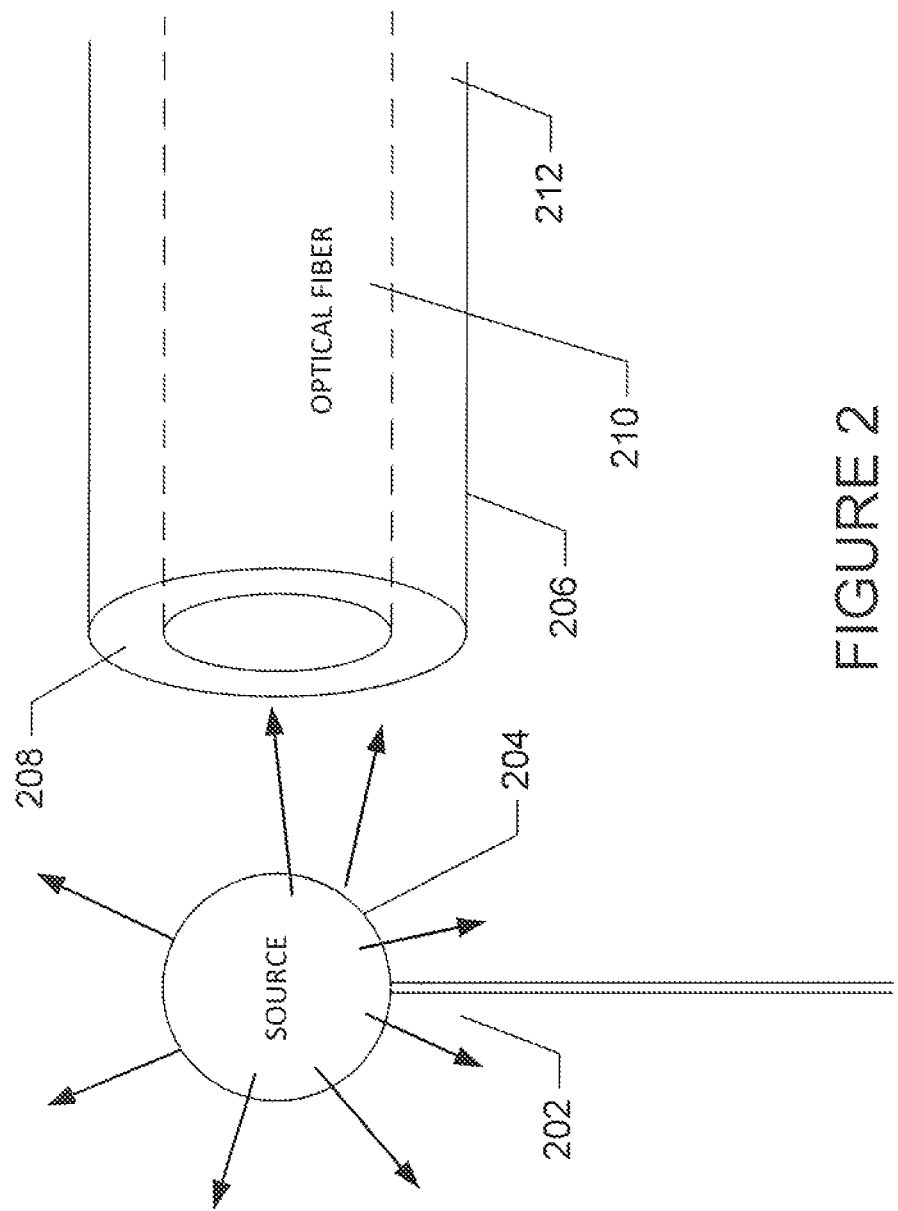
FIG. 2 illustrates introduction of light into an optical fiber that is used, as in the example shown in FIG. 1, as a light source within a scientific instrument, technical instrument, or other device.

FIG. 2 illustrates introduction of light into an optical fiber that is used, in the exemplary application shown in FIG. 1, as a light source within a scientific instrument, technical instrument, or other device. In general, a light source 202 may emit light in many or all outward, radial directions through an imaginary sphere 204 or other manifold enclosing the light source. However, only a small portion of the light emitted by the light source is directionally aligned with the long axis of an optical fiber 206 into which light is directed for transmission through the optical fiber to a distal endpoint that serves as a light source within the scientific instrument. Moreover, the surface at the end of the optical fiber 208, which generally comprises a central, light-transmitting glass or polymer core within a surrounding reflective cladding layer 212, may partially reflect a portion of the properly oriented light from the light source away from the optical fiber, further diminishing the amount of light that is effectively transmitted through the end of the optical fiber into the optical fiber. Many different techniques can be used to capture a greater portion of the light emitted by a light source for transmission through the end of the optical fiber into the optical fiber, including use of parabolic mirrors and other techniques. However, in general, only a small portion of the light emitted by non-directionally oriented light sources, such as heated filaments and arcs, can be effectively concentrated at the end of an optical fiber for introduction into the optical fiber.

Furthermore, there are physical limitations on the amount of light that can be concentrated through an aperture. The Lagrange invariant, or étendue, expresses the maximum amount of light that can be transmitted through an aperture. One mathematical form of the étendue is:

$$\text{étendue} = n^2 \iint \cos(\theta) dA d\Omega,$$

where n is the index of refraction and $\theta$ is the angle between the normal to the differential area dA and the centroid of the differential solid angle $d\Omega$. Thus, obtaining a sufficient photon flux through an optical fiber by illuminating the optical fiber with an external light source is generally problematic, and constrained by physical and practical constraints.

Currently, many applications, including fluorescence-microscopy applications, mercury arc lamps, xenon lamps, or metal-halide lamps, and hybrid arc lamps that combine mercury vapor, xenon, and other light-emitting substances are used. These lamps provide relatively continuous light output over the visible range, are well known, and relatively economical, but are associated with certain disadvantages. The lamps have finite useful lives, require relatively large power supplies for supplying high current for lamp operation and high-voltage pulses to power-on the lamps, operate at relatively high temperatures, and require shielding both for temperature, explosion hazard, and for stray light emission, and often require transmission-path filters to remove infrared ("IR") and ultraviolet ("UV") components of the light. Only a very small portion of the light emitted by such lamps can be effectively concentrated through the end of an optical fiber, and thus a very large proportion of the energy used in operating the lamps ends up as unwanted waste heat.

Figure 3:
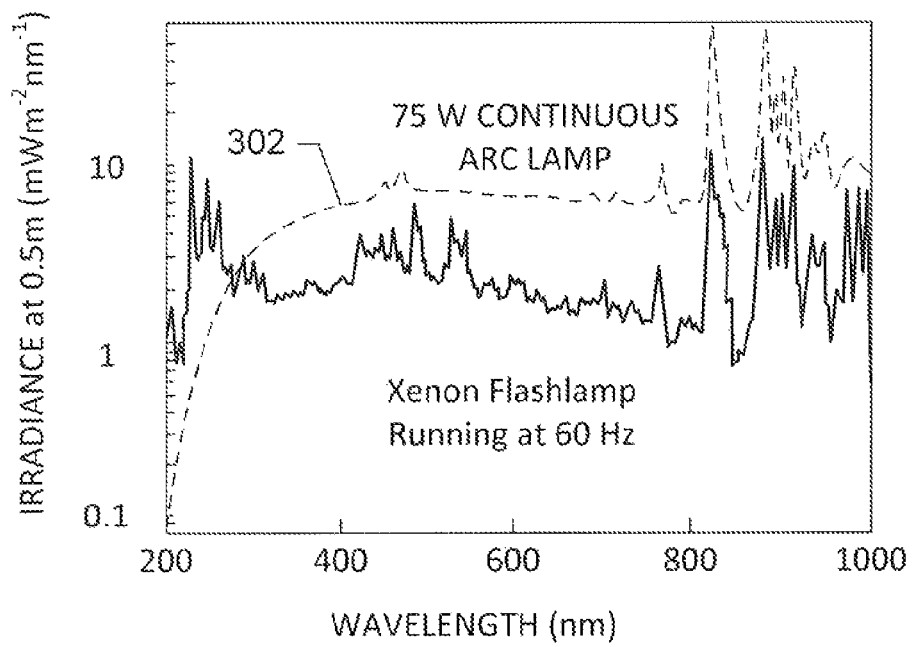
FIG. 3 shows the output spectra of a continuous xenon arc lamp and a xenon flash lamp.

FIG. 3 shows the output spectra of a continuous xenon arc lamp and a xenon flash lamp. While the continuous xenon arc lamp, shown by the dashed line 302, produces a relatively continuous light output over the wavelength range of visible light, from 380 nm to 750 nm, the continuous xenon arc lamp also produces significant output in both the ultraviolet wavelength range and in the infrared wavelength range. IR emission is not useful for optical microscopy or fluorescence microscopy, and produces significant heat, generally removed by filters. UV emissions, highly deleterious for certain applications, including live-cell imaging by fluorescence microscopy, are also generally removed by filters. UV and IR filters may decrease the photon flux with the desired wavelength range, and may not perfectly eliminate the undesirable wavelengths. Thus, heated-filament-based and arc-based light sources, while useful and available, are associated with many undesirable characteristics for various applications.

Laser sources provide relatively high photon flux and highly-directionally oriented light output. However, lasers produce coherent light, which is associated with a variety of diffraction-related problems, including speckling, and is therefore undesirable for many optical imaging purposes. Furthermore, lasers generally emit monochromatic light, while many applications need to be able to select wavelength ranges from across the visible spectrum, and lasers may be prohibitively expensive for many applications.

Figure 4:
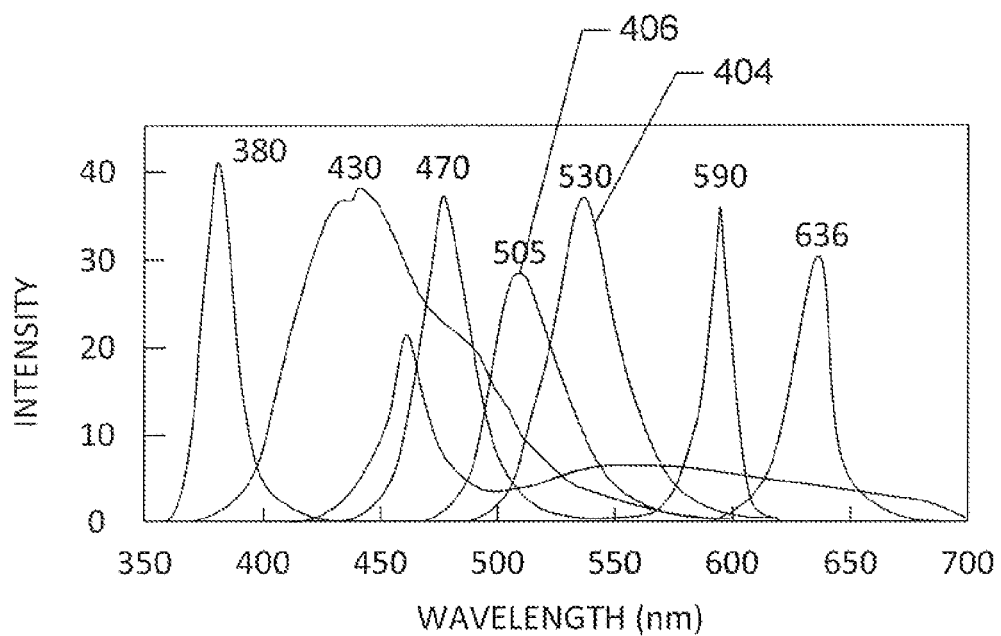
FIG. 4 shows the spectral output of a number of different types of LEDs.

Light emitting diodes ("LEDs") are a more recent light-source development. LEDs are generally fashioned from two semiconducting layers, doped with impurities, that create a p-n junction. The p-n junction is characterized by a small voltage potential across the junction due to different concentrations of positive and negative charge carriers on either side of the junction. When current flows across the junction, introduced by an externally applied voltage, negative charge carriers, or electrons, combine with positive charge carriers, or holes, resulting in a release of energy in the form of a photon. The wavelength of the light emitted by an LED depends on the band-gap energy of the materials that form the p-n junction. LEDs with different emission spectra can be fabricated by using different semiconducting materials, different dopants, and different levels of doping. FIG. 4 shows the spectral output of a number of different types of LEDs. In FIG. 4, each different peak corresponds to a different type of LED. Thus, one type of LED produces the 530 nm peak 404 and another type of LED produces the 505 nm peak 406. Comparing FIG. 4 to FIG. 3, it is apparent that LEDs produce emitted light within far narrower wavelength, or frequency, ranges than a xenon continuous arc lamp.

LEDs have many useful properties and characteristics with regard to light sources for various scientific and technical applications. LEDs can be fabricated to emit light over almost desired portion of the visible spectrum without producing unwanted UV or IR emissions, or emission of electromagnetic radiation of even shorter or longer wavelengths. While LEDs produce heat, they generally produce far less heat than incandescent lights or arcs. LEDs have extremely long lifetimes, and can be relatively inexpensively produced. Furthermore, LED output can be controlled both electronically and by temperature, with the peak emission wavelength adjustable by adjusting the temperature at which an LED operates. LEDs can, in addition, be rapidly switched on and off, or amplitude modulated, which is desirable in many different applications, including pulsed light emission for fluorescence microscopy that ameliorates fluorophore bleaching often observed under continuous illumination. However, LEDs produce significantly lower photon fluxes than either arc lamps or lasers. As a result, the amount of light that can be successfully harvested from an external LED and concentrated through the end of an optical fiber is generally too low for many practical applications, including fluorescence microscopy.

Figure 5:
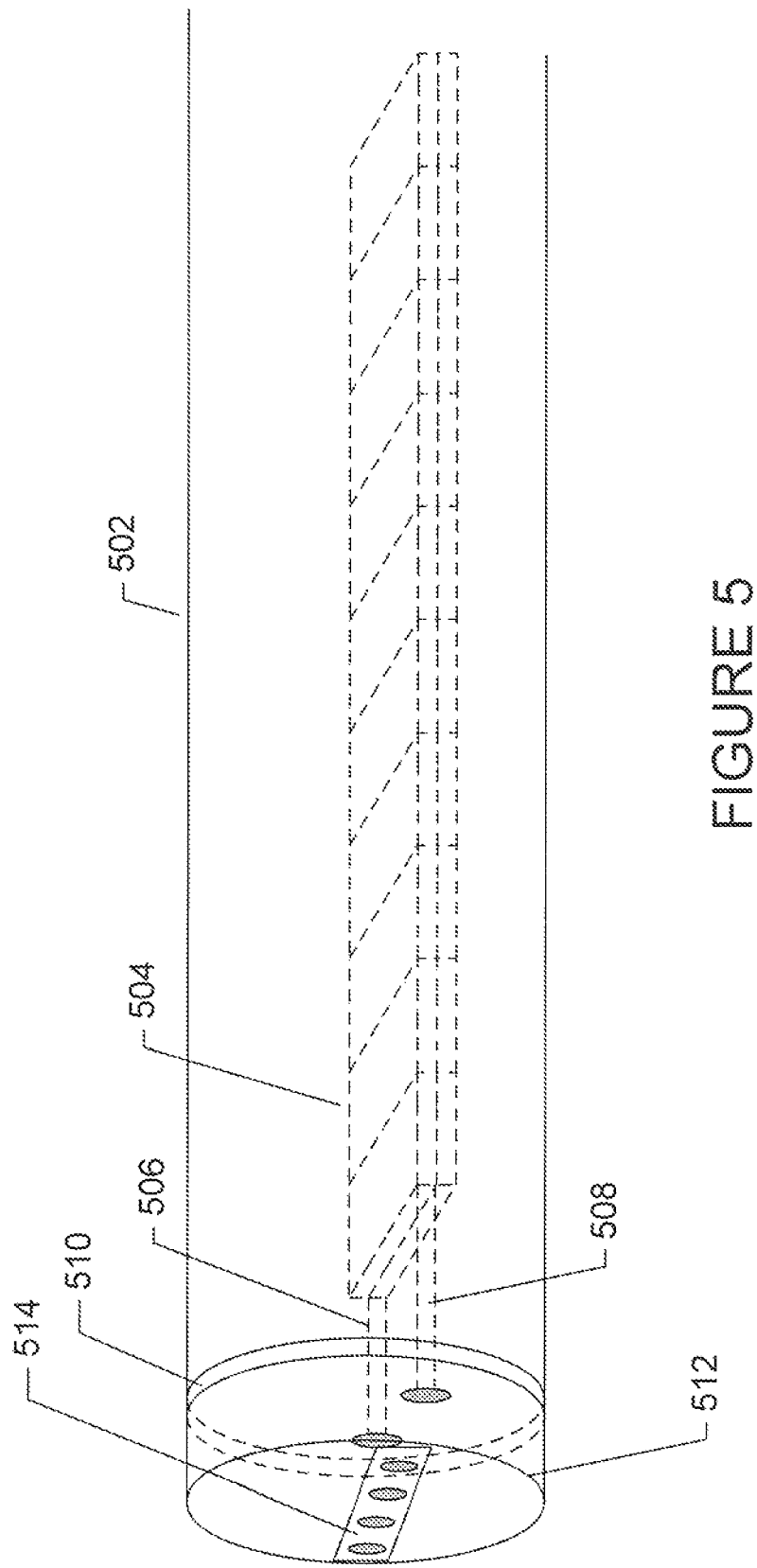
FIG. 5 illustrates one embodiment of the present invention.

Embodiments of the present invention are directed towards using LEDs as components of optical-fiber-based light sources for various scientific and technical applications, including fluorescence microscopy and spectrometry. FIG. 5 illustrates one embodiment of the present invention. FIG. 5 shows the core of an optical fiber 502 into which a linear array 504 of LEDs is embedded. Electrically conductive signal lines or signal paths 506 and 508 lead from the array of LEDs 504 through a reflective coating 510 on the end of the optical fiber to an adapter 512 that translates external current and control signals applied through an electrical interface 514 into voltage signals applied across the individual LEDs in the array of LEDs 504. By placing the LEDs within the optical fiber, physical limitations on the photon flux that can be transmitted through the end of the optical fiber are circumvented, as are reflectance losses. Thus, the photon flux produced by the array of LEDs can greatly exceed the photon flux that would be introduced into the optical fiber from an LED light source. Moreover, each LED in the array of LEDs contributes light to the cumulative photon flux within the optical fiber, with near-linear flux increase with increase in the number of LEDs embedded inn the optical fiber. A large portion of the light emitted by the LEDs is transmitted along the length of the optical fiber by total-internal reflection at the interface between the reflective layer and the inner light-transmitting core of the optical fiber and emitted from the end of the optical fiber, since the angle of incidence of the light transmitted along the fiber with the end of the fiber is below the critical angle.

Figure 6:
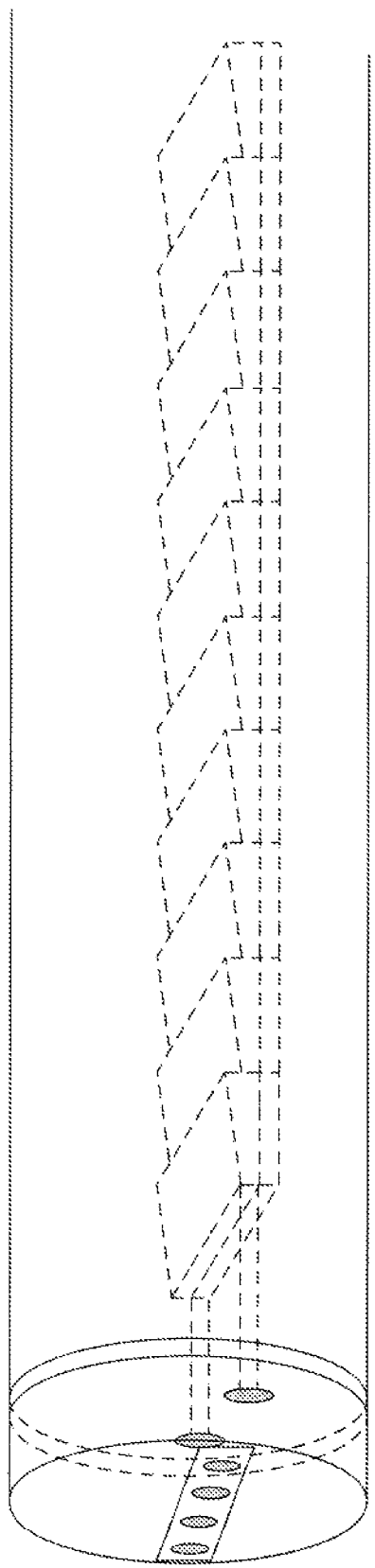
FIG. 6 shows an alternative embodiment of the present invention in which each LED of an array of LEDs is tilted with respect to the plane of the array of LEDs in order to increase the amount of light output into the optical fiber from each LED, and thus increase the cumulative brightness of the optical-fiber light source.

In general, each LED in the array of LEDs emits light over a range of directions, or a solid angle, above the direction parallel to the plane of the linear array of LEDs. FIG. 6 shows an alternative embodiment of the present invention in which each LED of an array of LEDs is tilted with respect to the plane of the array of LEDs in order to increase the amount of light output into the optical fiber from each LED, and thus increase the cumulative brightness of the optical-fiber light source. In the embodiment of the present invention shown in FIG. 6, light emission may be maximal normal to the edges of the individual LEDs, and minimal normal to the plane of the array of LEDs. Although a linear array of LEDs can be conveniently fabricated using well-known photolithography techniques, alternative embodiments of the present invention may incorporate individual LEDs within the optical fiber along the axis of the optical fiber. Any of many different methods can be used to electrically interconnect the LEDs to external voltage and current sources. Electrical contacts may be fabricated photolithographically, within the array of LEDs, and metallic or conducting-polymer leads can be employed to interconnect the array of LEDs with external voltage signals.

Figure 7:
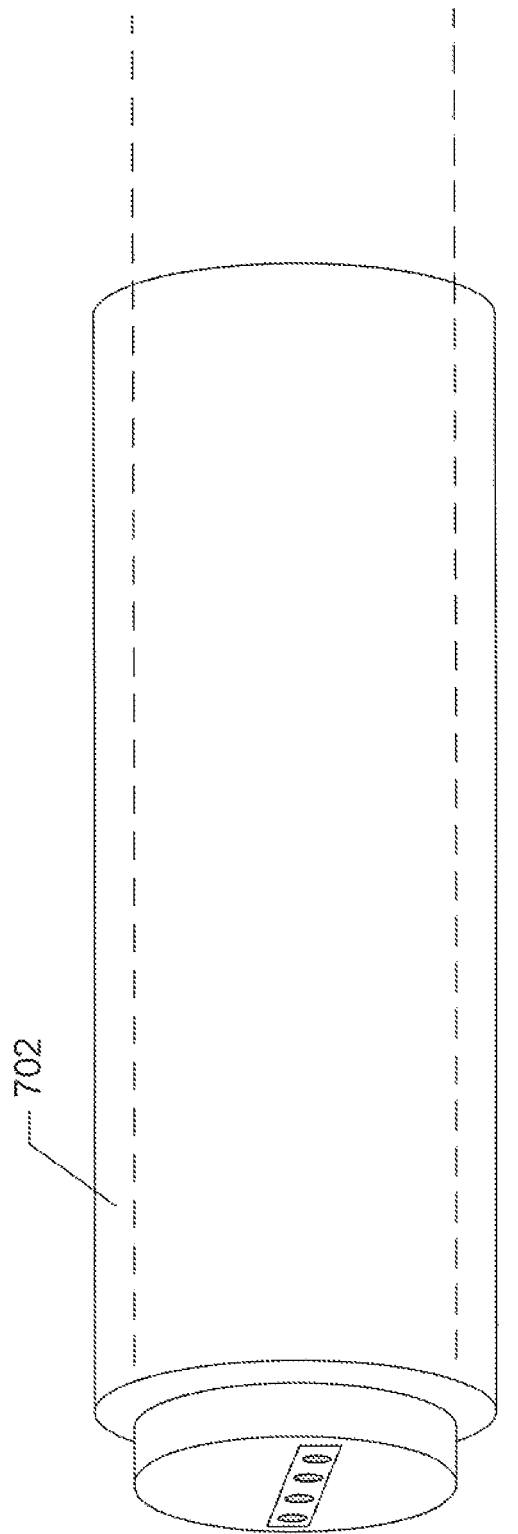
FIG. 7 illustrates a thermal-control sheath surrounding an optical fiber including embedded light sources that represents an embodiment of the present invention.

FIG. 7 illustrates a thermal-control sheath surrounding an optical fiber including embedded light sources that represents an embodiment of the present invention. The thermal-control sheath 702 may be fabricated from metal or conductive polymer, and interconnected with a voltage source in, order to provide resistive heating or incorporated in a thermocouple circuit in order to provide both heating and cooling under electronic control. The thermal-control sheath can thus be fabricated to control the temperature within the optical fiber.

LEDs produce heat during operation. While a thermocouple-based thermal-control sheath, such as that shown in FIG. 7, may be employed to remove this heat, the optical fiber that represents one embodiment of the present invention may be additionally immersed in an air stream or liquid coolant in order to control the temperature within the optical fiber.

In certain embodiments of the present invention, multiple instances of each of a variety of different types of LEDs may be incorporated within the optical fiber, with each group of one type separately electronically controlled so that the range of wavelengths of light generated by the LEDs can be electrically controlled. For example, referring to FIG. 4, LEDs of the type corresponding to peak 404 may be turned on, and all other LEDs turned off, in order to produce light in the range of 510 to 550 nm. When a slightly broader wavelength range is needed, LEDs of the type corresponding to peak 404 and of the type corresponding to peak 406 may be turned on, and all other LEDs within the optical fiber turned off, in order to generate a broader range of wavelengths between 490 and 550 nm. By selecting which of the different types of LEDs to turn on, and by carefully controlling the temperature within the optical fiber, the optical-fiber light source of the current invention can be optically tuned to produce high photon flux within relatively narrow, selected wavelength ranges.

Figure 8:
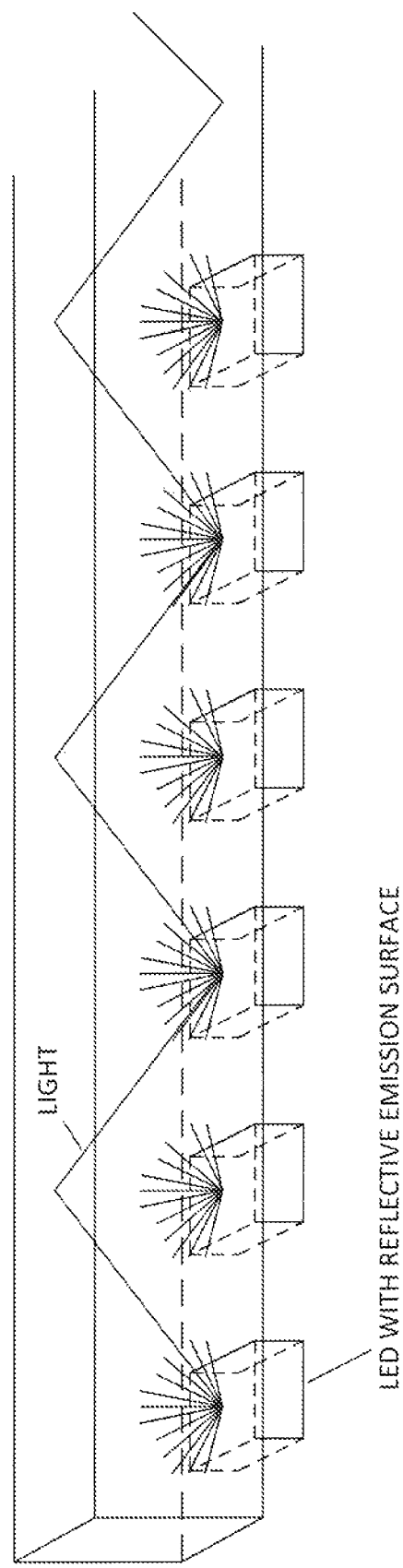
FIG. 8 shows another alternative embodiment of the present invention.

FIG. 8 shows another alternative embodiment of the present invention. The embodiment shown in FIG. 8 includes LEDs with a reflective emission surface mounted and optically coupled in series along the sidewall length of the optical fiber. Light emitted from upstream LEDs bounces off the reflective surface of downstream LEDs and remains in the fiber. According to this embodiment, the fiber cross section has at least one flat surface for LED coupling, such as a hemicylindrical or square fiber. In this and similar embodiments of the present invention, although there may be greater light loss as a result of transmitting light across the surface of the optical fiber, the ability to mount multiple LEDs along the length of the optical fiber provides transmitted light within the optical fiber of adequate intensity.

FIGS. 9A-D illustrate additional embodiments of the present invention. As with the embodiment shown in FIG. 8, the LEDs, in the embodiments shown in FIGS. 9A-D, are coupled to external surfaces of an optical fiber with rectangular cross section. In the embodiment shown in FIG. 9A, the LEDs, such as LED 902, arc mounted to all four sides of an optical fiber 904 of rectangular cross section. FIGS. 9B-D illustrate alternative embodiments of an optical-fiber-based light source with optical-fiber-surface-mounted LEDs. FIGS. 9B-D show a rectangular optical fiber with optical-fiber-surface-mounted LEDs end-on, with the long axis of the rectangular optical fiber normal to the surface of the figure. In the embodiment shown in FIG. 9B, LEDs, such as LED 906, are mounted to all four sides of the optical fiber 908. In the embodiment shown in FIG. 9C, LEDs arc mounted to only one pair of opposing surfaces. In the embodiment shown in FIG. 9D, LEDs are mounted to two adjacent surfaces.

In certain embodiments of the present invention, light sources mounted to one side of an optical fiber of rectangular cross section can be staggered with respect to LEDs mounted to one or more other surfaces of the optical fiber with rectangular cross-section. In certain embodiments of the present invention, the discrete LEDs may be linearly arrayed along the long axis of the optical fiber at fixed intervals, while, in other embodiments of the present invention, the spacing between LEDs may vary along the length of the optical fiber.

Figure 10:
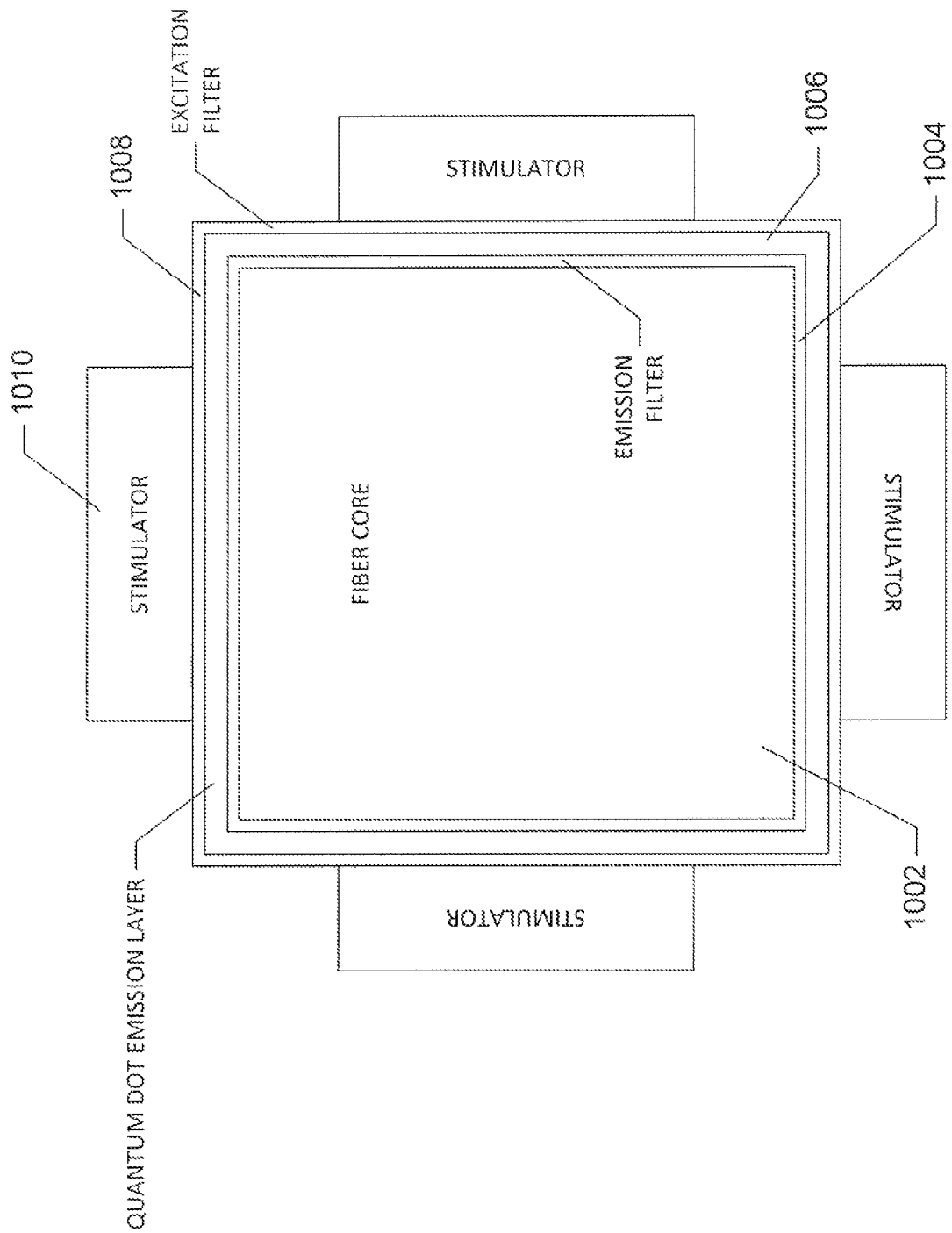
FIG. 10 illustrates, using the general illustration convention of FIGS. 9B-D, an additional embodiment of the present invention.

FIG. 10 illustrates, using the general illustration convention of FIGS. 9B-D, an additional embodiment of the present invention. As with FIGS. 9B-D, FIG. 10 illustrates an optical fiber with rectangular cross section end-on, with the long axis of the optical fiber normal to the plane of the paper. In the embodiment shown in FIG. 10, the optical-fiber core 1002 is surrounded by a thin emission-filter layer 1004, a generally thicker quantum-dot emission layer 1006, and an outer excitation-filter layer 1008, to which LEDs, such as LED 1010, arc mounted. The LEDs may be mounted on all four sides, as in the embodiment shown in FIG. 9B, on one pair of opposing sides, as in the embodiment shown in FIG. 9C, or on a pair of adjacent sides, as in the embodiment shown in FIG. 9D. In the embodiment shown in FIG. 10, the LEDs, when electronically activated, emit light that is filtered, by the excitation filter layer 1008, to stimulate quantum dots within the quantum-dot emission layer 1006 to emit light. The light emitted by the quantum dots then passes through the emission filter layer 1004 to produce one or a few selected wave lengths of emitted light within the fiber core. In certain embodiments of the present invention, the outer excitation-filter layer is a dichroic optical interface that passes a narrow range of wave lengths corresponding to the excitation wave length for the quantum dots, and the inner emission-filter layer 1004 is a substance having a narrow transmission band that acts as a narrow band-pass filter to transmit a selected wave length or several selected wave lengths of light emitted from the quantum dots into the fiber core. In certain embodiments of the present invention, the quantum-dot emission layer may include several different types of quantum dots with different emission characteristics, with different excitation filters and emission filters employed on different surfaces of the light-emitting optical fiber so that each surface, or pair of surfaces, excites particular types of quantum dots in the quantum-dot emission layer, with the emission filter on each surface or pair of surfaces having appropriate band-pass characteristics to transmit a particular wave length of emitted light from the particular type of quantum excited at that surface. The excitation-filter layer and/or emission-filter layer may be omitted in certain embodiments of the present invention.

In alternative embodiments of the present invention, the externally mounted LEDs may be arrayed along the length of the optical fiber in a variety of complex, three-dimensional arrangements, including a helical array of LEDs along an optical fiber with circular or elliptical cross section, a stepped or alternating pattern along an optical fiber with a rectangular cross section, and other such arrangements. The cross section of the light-emitting optical fibers of various embodiments of the present invention may be circular, elliptical, rectangular, square, or may have more complex geometries. Light sources may include various different types of semiconductor devices, in addition to LEDs. Additional types of light sources may include tiny lasers, organic-semiconductor-based LEDs, and other types of materials that can be stimulated to emit light through incident electromagnetic radiation, changes in the thermal environment of the light-emitting devices, changes in the pressure of the light-emitting materials, changes in externally applied fields, including electromagnetic fields, and applied electrical voltage or current.

Although the present invention has been described in terms of particular embodiments, it is not intended that the invention be limited to these embodiments. Modifications will be apparent to those skilled in the art. For example, a wide variety of different types of LEDs can be fabricated and embedded within an optical fiber. These include semiconductor-based and organic-polymer-based LEDs with a variety of different dopants. LEDs may be directly embedded into the optical fiber, or, alternatively, may be inserted within a cavity at the end of the optical fiber that is subsequently filled with an index-matching solution, to ameliorate reflective light loss. In certain embodiments of the present invention, the LEDs can be coupled to the optical fiber using an index-matching solution. Metallic or semiconductor electrical contacts can be fabricated, according to many different designs and topologies, to provide electrical connection to the LEDs embedded within the optical fiber. In certain embodiments, the composition of the optical fiber may be varied to produce intrinsic, LED-like regions within the optical fiber that can be electronically controlled to output light. In alternative embodiments of the present invention, optical fibers embedded with light sources may be bundled together to produce bundled-optical-fiber cables for increased brightness and to provide greater control over the emission characteristics of the light source. Optical fibers fabricated according to the present invention may additionally include additional reflective layers and coating, filter elements, and other components for controlling the photon flux within the optical fiber and selecting wavelength ranges for emission. In certain embodiments of the present invention, embedded light sources may have random orientations and random distributions, while in other embodiments of the present invention, the embedded light sources may be organized as linear arrays, two-dimensional arrays, or stacked arrays of LEDs. In certain embodiments of the present invention, discrete, individual LEDs are embedded along an optical fiber. In certain embodiments of the present invention, the LEDs may be transparent, or semi-transparent, to decrease internal light loss.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical-fiber-based light source comprising:
an optical-fiber core,
quantum-dot component light sources included in a quantum-dot light-emission layer surrounding the optical-fiber core;
a light-emission-stimulation subsystem that, when activated, stimulates the quantum-dot component light sources to emit light into the optical-fiber core, a portion of which is transmitted by total-internal reflection along the length of the optical-fiber-based light source and emitted from the end of the optical-fiber-based light source;
and further including an excitation-filter layer between the light-emission-stimulation subsystem and the quantum-dot light-emission layer.

2. The optical-fiber-based light source of claim 1, wherein the light-emission-stimulation subsystem includes light-emitting diodes.

3. The optical-fiber-based light source of claim 1 wherein the optical-fiber core, including the quantum-dot component light sources included in the quantum-dot light-emission layer, the light-emission-stimulation subsystem and the excitation-filter layer are fully or partially enclosed within a thermal-control sheath for supplying and/or removing heat.

4. The optical-fiber-based light source of claim 1, wherein the light-emission-stimulation subsystem is mounted to one or more surfaces of the optical-fiber core.

5. The optical-fiber-based light source of claim 4 wherein the light-emission-stimulation subsystem is mounted to all four surfaces of an optical fiber with rectangular cross section.

6. The optical-fiber-based light source of claim 4 wherein the light-emission-stimulation subsystem is mounted to two opposing surfaces of an optical fiber with rectangular cross section.

7. The optical-fiber-based light source of claim 4 wherein the light-emission-stimulation subsystem is mounted to two adjacent surfaces of an optical fiber with rectangular cross section.

* * * * *